June 25, 1968            E. S. BAKER            3,390,275

ZERO POWER DETECTOR SWITCH AND POWER TRANSFER SYSTEM

Filed Sept. 14, 1964            5 Sheets-Sheet 1

INVENTOR.
EDWARD S. BAKER

BY Reynolds & Christensen

ATTORNEYS

INVENTOR.
EDWARD S. BAKER
BY Reynolds & Christensen
ATTORNEYS

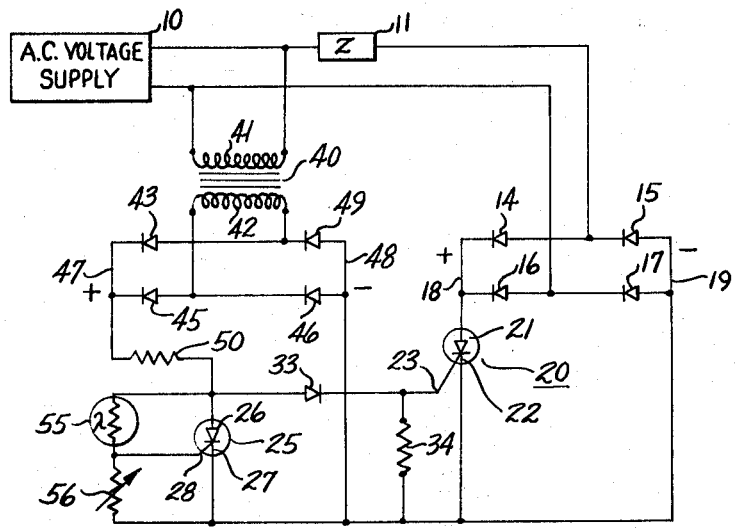

June 25, 1968     E. S. BAKER     3,390,275
ZERO POWER DETECTOR SWITCH AND POWER TRANSFER SYSTEM
Filed Sept. 14, 1964     5 Sheets-Sheet 4

INVENTOR.
EDWARD S. BAKER
BY
ATTORNEYS

INVENTOR.
EDWARD S. BAKER
BY
Reynolds & Christensen
ATTORNEYS

United States Patent Office 3,390,275
Patented June 25, 1968

3,390,275
ZERO POWER DETECTOR SWITCH AND POWER TRANSFER SYSTEM
Edward S. Baker, Seattle, Wash., assignor to The Boeing Company, Seattle, Wash., a corporation of Delaware
Continuation-in-part of application Ser. No. 378,377, June 26, 1964. This application Sept. 14, 1964, Ser. No. 398,829
29 Claims. (Cl. 307—64)

ABSTRACT OF THE DISCLOSURE

The present invention relates to zero power detector switches and power transfer systems adapted to switch power on and off in an A.C. system and to transfer power for a load from one power supply to another power supply. Circuits are disclosed for sensing when an alternating power supply voltage is crossing a zero reference axis with the circuit then operating to apply the power supply voltage to a load in a noise free manner. Details of circuits are provided for pre-gating silicon controlled rectifiers in the zero power turn-on circuits for further reducing sources of noise signals associated with turn-on of such devices. A power transfer system for transferring the load on one power to a different power supply without the generation of electrical disturbance to the load is also disclosed in detail.

---

The present application is a continuation-in-part of my prior U.S. patent application Ser. No. 378,377, filed June 26, 1964 (now abandoned).

When an alternating current (A.C.) power supply is connected or disconnected from a given load an electric disturbance in the nature of noise is generated as a result of the opening and closing of the control switches unless such opening or closing occurs at a time when the power supply voltage is at its zero level. It is also found with transformer loads that a current surge is encountered when power is turned on in phase opposition to the phase at which the power was last turned off in the transformer. The probability of turning power on and off when a power supply voltage is zero with random turn-on and turn-off of a conventional switch is remote and therefore the opening and closing of switches in an A.C. system generally causes noise signals to be generated and also leads to deterioration of the usual mechanical switch contacts.

Disturbances generated by the opening and closing of switches is particularly objectionable in aircraft systems. Such disturbances are also of considerable concern in the transferring of power from a ground unit to the internal power supply of an aircraft. It is common practice in the air transportation industry to provide a separate ground power unit for supplying electrical energy to an aircraft during the time that the craft is on the ground. This eliminates the need for maintaining one or more engines of the aircraft running during the time that the craft is on the ground and being prepared for take-off. With present day navigation equipment it is not uncommon for a plane to be on ground power for several hours prior to take-off. However, when the plane is ready for take-off, it has been found that the various disturbances such as noise interruptions in the sine wave generated in transferring from the ground power unit to the internal supply of the airplane causes many problems. One such problem is that during the time that the plane is being provided with ground power various computer systems are in operation which are sensitive to power supply disturbances. Unless the power transfer from the ground power unit to the aircraft power supply takes place in a manner such that the two supplies are substantially in phase at the time of transfer and unless the transfer is accomplished with little or no disturbance as a result of the transfer, computers and other electronic equipment carried by the plane are disrupted in their normal operation. When this occurs the various systems must be readjusted and corrected prior to take-off, leading to costly on-the-ground time with the engines running.

A further object of the present invention is to provide an improved power switch adapted to open and close the circuit form an A.C. supply to a load at times when the voltage of the power supply is crossing a zero axis.

It is another object of the present invention to provide an improved zero power detector switch which is readily controlled from an A.C. or D.C. external control.

Another object of the present invention is to provide an improved zero power detector switch in combination with a sening element which controls the switch in a manner such that a subtantial amount of power may be supplied to a load in response to a low level signal provided by the sensing element and wherein the power is transferred to the load in response to such signal at a time when the main power supply current is passing through its zero level.

Another object of the present invention is to provide an improved zero power detector switch adapted to provide appropriate gating signals to current gates connected in series circuit arrangement between an A.C. power supply and a load so that the current gates are repeatedly turned on and off with a minimum of electrical noise being generated.

A further object of the present invention is to provide a power switching circuit for initially providing power from an A.C. supply to a load such as a transformer at a time when the rate of change of current in the power supply output is small and to then thereafter cause turn-on of the current gates when the power supply voltage is crossing its zero reference axis.

It is another object of the present invention to provide a power transfer system for transferring power to a load from a first supply to that provided by a second power supply.

Another object of the present invention is to provide an improved power transfer system wherein power being supplied to a given load by a first power supply is interrupted and power from a second supply is provided to the load with the transfer occurring with little or no electrical noise or disturbance of the load power.

A further object of the present invention is to provide a power transfer system for transferring power to a load from one power supply to another supply wherein the frequency of the two power supplies are not exactly the same and wherein the power transfer occurs at a time when the two supplies are substantially in phase.

A further object of the present invention is to provide an improved power transfer system which transfers power to a load from one supply to another supply at a time when the two supplies are substantially in phase and at a time when the power levels of the supplies are crossing zero reference axes.

Another object of the present invention is to provide an improved power transfer system which makes use of solid-state components and in which power is transferred from one supply to another supply with little or no electrical disturbance being generated as a result of the power transfer.

In accordance with the teachings of the present invention a current gate such as a silicon controlled rectifier (SCR) is connected in series circuit arrangement with a load to be supplied with energy from an A.C. power supply. The silicon controlled rectifier is advantageously connected in the power circuit by means of a full-wave rectifier so that the SCR is provided with unidirectional current by the A.C. power supply. A control circuit is connected to the main power SCR in a manner such that the SCR is rendered conductive or nonconductive at times when the A.C. power supply is passing through its zero power level. In accordance with one embodiment of the invention the control of the power SCR is provided by a second SCR connected in parallel with the first main power control SCR but with a current-limiting impedance element being in circuit with the second SCR. The second SCR serves to clamp the gate of the power SCR at a voltage such that the gate of the power SCR cannot be raised above the cathode by an amount sufficient to cause the power SCR to become conductive. When the gate signal on the second SCR is removed the second SCR becomes nonconductive the next time the power supply voltage reaches its zero level. This removes the clamping action of the second SCR and permits the power SCR to receive a gating signal as soon as the power supply voltage departs from zero. As a result the normal current surge and associated noise caused by closing a switch in an A.C. circuit is eliminated. If the second SCR is again provided with a gating signal, the next crossing of the zero axis by the power supply voltage will cause the second SCR to turn on and the power SCR to remain off. Thus the normal noise associated with opening a switch in an A.C. circuit is eliminated, since the main controlled rectifier is rendered nonconductive only at a time when the power supply is at its zero level. The second SCR by being connected in parallel with the main control SCR together with the bias circuit for the power SCR ensures that regardless of when the switch for the second SCR is operated the power to the load will be turned on or off only at a time when the A.C. power supply is passing through its zero power level.

In accordance with another embodiment of the invention the gating signal for the main current gate is obtained by means of transformer action from the main A.C. power supply. By using this arrangement it is found that the amount of current available for the gates of the two SCR's is increased and hence over-all circuit operation is improved. In addition, such an arrangement avoids leakage current to the load and makes possible easy adjustment of the time for turn-on of power to a load in certain applications as described hereinafter.

Since low level signals applied to the gate electrode of the second SCR will serve to turn on or off at zero power level the power from an A.C. supply, the switch of the present invention can be used with a detecting element for switching in a noise-free manner substantial power. Thus in accordance with another embodiment of the invention a heat sensitive element is placed in the gate circuit of a silicon controlled rectifier which in turn controls a main power SCR so that a small change in the level of the output signal across the detecting element will control a substantial amount of power to a given load with the power being applied to the load at a time when the power supply level is at its zero point. This improved detection circuit is thus well suited for use in aircraft where the generation of noise signals such as those normally associated with the opening and closing of switches in an A.C. power supply must be avoided.

When current gating devices such as silicon controlled rectifiers are used for controlling the flow of substantial currents in an A.C. system it has been noted that as the SCR's are turned on at each crossing of the zero reference axis by the supply voltage the slight time lag for turn-on of the SCR gives rise to radio frequency noise of extremely high level and at twice the frequency of the supply. Since the level of such noise associated with the repeated turn-on of the controlled rectifiers gives rise to considerable noise a circuit arrangement for eliminating such noise is advantageous. In accordance with the present invention the gating signals applied to the gate electrodes of a pair of silicon controlled rectifiers which control the flow of power from an A.C. supply to a load are adjusted in phase relation to the power supply so that the gating signals lead the voltage being applied to the controlled rectifiers. This preconditions each rectifier for conduction and is found in practice to substantially eliminate the R.F. noise caused by the necessity of the application of a certain forward bias thereto for turning the rectifiers on. While the initial turn-on of power to a given load may result in a single noise signal being generated, thereafter the power applied to the load is substantially noise free and in particular is free from the normal noise associated with the turn-on of the silicon controlled rectifiers. A further advantage is obtained in that when the load is inductive, as for example a transformer load, it can be shown that turning the power on in the transformer at a time when the rate of change of current from the supply is at or near a minimum will avoid the extremely large current surge normally associated with turn-on in one phase of a transformer which was last turned off in the opposite phase. With one embodiment of the invention the point of initial turn-on of power is selectively adjustable with the subsequent gating of the control gates occurring in a manner to avoid radio frequency noises.

In accordance with other objects of the invention a power transfer system is provided which makes use of a phase detector having A.C. signals from two power supplies simultaneously applied thereto. For purpose of illustration the invention is disclosed with reference to a system for transferring power from a ground power unit to the internal power supply of an aircraft. In such arrangements an attempt is made to maintain the frequency of the ground power unit and of the aircraft supply substantially the same, but it is found in practice that there is often as much as two or three cycles difference between the two power supplies. Thus the phase relationship between the two supplies constantly changes. The phase detector serves to provide an indication of the time when the two power supplies are substantially in phase and provides a control signal for transferring power from the ground power unit to the airplane power supply at such time. By the use of suitable zero power detecting switches such as those described above, the airplane power supply is turned on at a time when the power being provided therefrom is crossing the zero reference axis. Such turn-on of the airplane power supply then serves to provide an appropriate signal to a gate circuit for the ground power unit so that when the power output of the ground power unit next reaches its zero reference axis it is turned off. As a result load power is transferred from the ground supply to the airplane supply with no interruption of power and with no detectable noise signal being generated. The phase detector in the system thus causes the power to be switched at a time when the two power supplies are substantially in phase and the zero power detector switches make certain that power is turned on and off at zero voltage.

In one specific power transfer system provided in accordance with the present invention zero power detector switches such as those described herein are used for detecting the time when the airplane power supply is passing through its zero reference level to turn the aircraft power supply on as well as for detecting the time when the ground power unit is passing through its zero reference level. It has been found in practice that using such zero power detector switches in the system taught in accordance with the present invention, power can be transferred from a ground power unit to the internal power supply of an aircraft without any interference with the normal operation of computers and other sensitive electronic equipment carried by the aircraft.

The above and additional advantages and objects of the present invention will be more clearly understood from the following description when read with reference to the accompanying drawings wherein:

FIGURE 1 is a schematic circuit diagram of a simplified zero power detector switch provided in accordance with the present invention;

5

FIGURE 3 is a schematic circuit diagram of a zero power detector switch provided in accordance with the present invention and illustrating the manner in which a detecting element such as a light sensitive resistor is utilized for providing the turn-on and turn-off signals to a silicon controlled rectifier;

FIGURE 4 is a schematic circuit diagram illustrating an embodiment of the present invention wherein the gating signals for a pair of main current gates are caused to lead the main power signal for a given load in a manner such that the noise signal associated with turn-on of such gates is substantially reduced;

Figure 1:
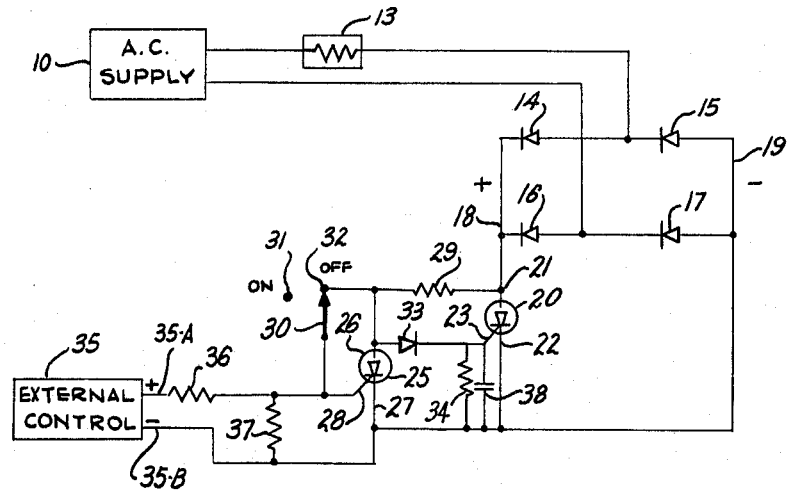
FIGURE 1A is an illustration of the power supply voltage and the load voltage wave-forms of the circuit of FIGURE 1.

Referring now to the drawings and in particular to FIGURE 1 there is shown for purpose of illustration an A.C. power supply 10 adapted to provide power to a suitable load shown for purpose of illustration as a resistor 13 connected to the power supply 10. A full-wave rectifier in the form of the diode bridge arrangement including diodes 14, 15, 16 and 17 will be seen to be connected in series circuit with load 13 across the power supply 10 and in circuit with a first current gating element shown for purpose of illustration as a silicon controlled rectifier 20 having an anode 21, a cathode 22 and a gate electrode 23. As is well known in the art, a silicon controlled rectifier of the type illustrated generally at 20 has the characteristic that even though a substantial voltage is applied between the anode and cathode thereof no current will flow therethrough unless a suitable signal is applied to the gate control electrode of the rectifier. To render the device conductive a positive signal is applied to its gate electrode at a time when its anode is positive with respect to its cathode. Once the controlled rectifier is rendered conductive however, subsequent signals applied to the gate electrode have no effect thereon and the conduction of the rectifier is terminated only by having the anode and cathode voltages made equal or having the cathode made positive with respect to the anode. Thus in many respects the silicon controlled rectifier is similar to a thyratron which, as is well known in the art, is rendered conductive by a suitable signal applied to a control grid and then thereafter the thyratron conducts heavily regardless of the further signals applied to the control grid.

In the circuit of FIGURE 1 it will be seen that the anode 21 is connected to the cathodes of the rectifiers 14 and 16 while the cathode 22 is connected to the anodes of the rectifiers 15 and 17. Thus the silicon controlled rectifier 20 is provided with an appropriate bias for maintaining the anode 21 positive with respect to the cathode 22 except at the time when the A.C. power supply voltage is crossing its zero reference axis. At that time the anode and the cathode 22 will be at the same voltage.

6

A second current gate such as a silicon controlled rectifier 25 will be seen to be connected in parallel with the first SCR 20 by having its anode 26 connected through the current limiting resistor 29 to the anode 21 and its cathode 27 connected directly to the cathode 22 of the controlled rectifier 20. The gate electrode 28 of the second SCR 25 is connected through a switch 30 and through the resistor 29 to the positive side of the full-wave rectifier arrangement provided by diodes 14–17. The switch 30 is illustrated as having an "ON" terminal 31 and an "OFF" terminal 32, these designations corresponding to the condition of the power being applied to the load 13. That is, when switch 30 is in its ON position power will be applied to the load 13 whereas positioning of the switch 30 to its OFF position prevents the application of full power to the load 13.

The operation of the circuit in FIGURE 1 is as follows. With the switch 30 in its OFF position the full-wave rectified power will be simultaneously applied to the two silicon controlled rectifiers 20 and 25. A diode 33 and a resistor 34 are connected in series circuit between the anode 26 of SCR 25 and the cathodes 27 and 22 of both SCR's. The gate electrode 23 of the first SCR 20 is connected to the junction between the cathode of the diode 33 and the resistor 34 and therefore the input impedance to the control gate of the first SCR 20 from the positive terminal 18 of the bridge rectifier is made slightly larger than the input impedance of the second SCR 25 when the switch 30 is in its OFF position. As the voltage of the positive terminal 18 starts to go positive from the zero reference axis when switch 30 is in its OFF position the second SCR 25 will be rendered conductive ahead of the power SCR 20 and hence the anode 26 thereof will be at approximately the voltage of its cathode 27, the drop across the SCR being a few tenths of a volt. As a result a clamping action occurs by virtue of the substantially short circuit path provided by switch 30 and therefore the gate electrode 23 of the first SCR 20 is not permitted to rise to a voltage sufficient to cause conduction of the first rectifier. While other arrangements might be used for maintaining the second SCR gate more sensitive than the first, the diode 33 is found to work well since it has a voltage drop of the same order as the drop across the SCR 25. Therefore it is not possible for the SCR 20 to be turned on as long as SCR 25 is conducting. It is known that the inherent sensitivity of SCR's differs and therefore in some cases it is possible to construct the switch of FIGURE 1 by using a more sensitive SCR for the SCR 25 and a less sensitive SCR 20. However the diode 33 ensures that even though the SCR 20 might be inherently more sensitive than SCR 25 the above operation will be obtained.

The impedance element shown as resistor 29 is made quite large and therefore a very small amount of current flows through the SCR 25. Thus in practice a very small amount of current is in fact provided by the A.C. supply 10 through the load 13 even at a time when the switch 30 is in its OFF position. However in the embodiment of the invention illustrated in FIGURE 1 the load 13 is of a nature such that this small amount of current has no effect on the load 13, as for example is the case when the load 13 is a current responsive device which responds only to currents greater than the small current provided through the large resistor 29.

Figure 1A:
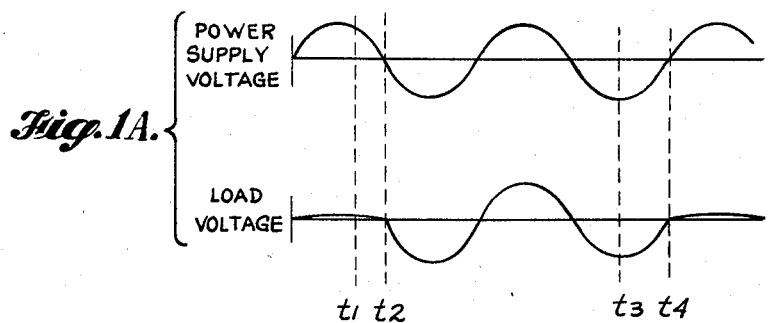

When the switch 30 is moved to its ON position the gate electrode 28 is no longer connected to the positive terminal 18 of the full-wave rectifier. Assuming the switch 30 is moved to its ON position at a time when the terminal 18 is at its maximum voltage it will be seen that the SCR 25 would at that time already be conductive and therefore would remain conductive until the voltage of the terminal 18 returns to its zero level. This is indicated in FIGURE 1A wherein it will be seen that switch 30 is moved to its ON position at time $t_1$ but no change occurs until time $t_2$. Then as the terminal 18 starts to go positive again at time $t_2$ such positive voltage will be applied through the diode 33 to the gate electrode 23 of the main current gate 20. At this time the SCR 25 will remain nonconductive since with the switch 30 in its ON position there is no gating signal applied to the gate electrode 28. As a result thereof the SCR 20 is rendered conductive and acts substantially as a short circuit across the full-wave rectifier. Full power is thus applied to the load 13. It will be seen that regardless of when the switch 30 is moved from its OFF position to its ON position the main power is switched to the load 13 starting at a time when the power level of the supply is at zero. Thus a zero detector turn-on switch is provided.

Assuming the circuit to be in a condition wherein the switch 30 is in its ON position and with the control rectifier 20 conducting the operation for turning the circuit off will now be described. When the switch 30 is moved from its ON position to its OFF position at time $t_3$ in FIGURE 1A it will be seen that at that time the positive terminal 18 of the full-wave rectifier is at its maximum voltage and thus a positive voltage would normally be applied to the gate electrode 28. However, as previously described, the SCR 20 is conducting at this time and therefore its anode 21 is effectively clamped to the voltage of its cathode 22. Accordingly there is not at this time a sufficient signal being provided to the gate electrode 28 to render the control rectifier 25 conductive. Thus even though the switch 30 is transferred to its OFF position at a time when the power supply is providing its maximum voltage the SCR 25 is not turned on and the rectifier 20 remains conductive. However when the level of the power provided by the A.C. supply 10 returns to its zero level at time $t_4$ the SCR 20 becomes nonconductive. Then during the following half cycle of the power supply 10 starting at time $t_4$ the operation previously described with the switch 30 in its OFF position will take place with the SCR 25 being rendered conductive ahead of SCR 20 and therefore serving effectively as a voltage clamp for preventing conduction of SCR 20 as long as the switch 30 remains in its OFF position.

To illustrate the versatility of the zero power detector switch of FIGURE 1 there is shown for purpose of illustration an external control apparatus 35 having a positive output terminal 35A and a negative output terminal 35B. The positive terminal 35A will be seen to be connected through the current limiting resistor 36 to the gate electrode 28. A bias resistor 37 is connected from the gate 28 to the negative terminal 35B. The arrangement is such that as long as the external control 35 provides a very small voltage on the gate electrode 28 with respect to cathode 27 the SCR 25 remains conductive and the major portion of the power from A.C. supply 10 is not applied to the load 13. With resistor 29 in the order of 68,000 ohms the leakage current through load 13 would be less than two mils using a 115 volt supply. When the small output voltage from the external control 35 is terminated or reduced to a point such that it no longer serves as a gate signal for the SCR 25 the SCR 25 becomes nonconductive when the power voltage next crosses the zero axis and the circuit operation described above when the switch 30 is in its ON position takes place. It should be noted that when the external control 35 is utilized for controlling the circuit of FIGURE 1 the switch 30 is placed in its ON condition and maintained in that position. It is found in practice with the arrangement of FIGURE 1 that a signal level of 0.6 volt with a current flow of approximately 80 microamperes from the external control 35 will serve to maintain the circuit in its OFF condition using an SCR 2N1595 as SCR 25 and a 2N1597 as SCR 20. The capacitor 38 may be used in the circuit as a stabilizing element.

Figure 2:
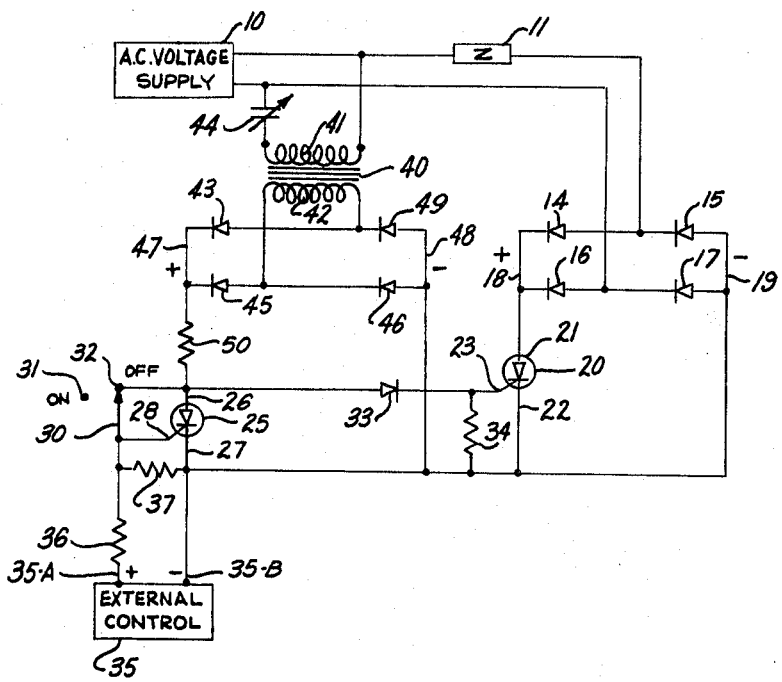
FIGURE 2 is a schematic circuit diagram illustrating a zero power detector switch which makes use of transformer action for providing the gating signals to a main current control element connected in series circuit with a load.

While the invention thus far described works well and particularly in those cases where a small leakage current through the load 13 has no adverse effect thereon, the arrangement of FIGURE 2 prevents such small leakage current and also provides additional advantages such as increased gating current and selectivity of timing of the gating signals.

Referring now to FIGURE 2 there is shown for purpose of illustration the A.C. power supply 10 adapted to provide suitable operating power to the load shown for purpose of illustration as an impedance element 11. A full-wave rectifier arrangement including the diodes 14–17 similar to that of FIGURE 1 and having the positive and negative terminals 18 and 19 is provided for maintaining full-wave rectified voltage on the current gating element shown as the controlled rectifier 20. Similar parts including the second controlled rectifier 25, the diode-resistor network including the diode 33 and resistor 34, the switch 30 and the external control 35 are included in the embodiment of the invention shown in FIGURE 2.

A transformer 40 having a primary winding 41 connected across the A.C. power supply 10 and a secondary winding 42 connected through a full-wave rectifier which includes diodes 43, 45, 46 and 49 is provided. The positive terminal 47 of the second full-wave rectifier is connected through a resistor 50 to the anode 26 of SCR 25 and also through diode 33 to the gate electrodes 23 of SCR 20. With the switch 30 in its OFF position it will be seen that as the output voltage from the A.C. supply 10 increases the two full-wave rectifier circuits will provide positive voltages to the anodes 21 and 26 of the SCR's 20 and 25. As in the embodiment of FIGURE 1, the positive voltage from the positive terminal 47 is simultaneously applied through resistor 50 directly to the gate electrode 28 across the switch 30 and through the diode 33 to the gate electrode 23. Due to the lower impedance for the gating current for the gate electrode 28 it is found that SCR 25 turns on first and therefore acts as a voltage clamp across the gate electrode-cathode circuit of SCR 20 as long as switch 30 is in its OFF position. However in the embodiment of FIGURE 2 it should be noted that with the switch 30 in its OFF position there is no current flow through the load 13 since the control rectifier 20 remains nonconductive and the transformer winding 41 is connected across the A.C. power supply 10 ahead of the load 13.

Figure 2A:
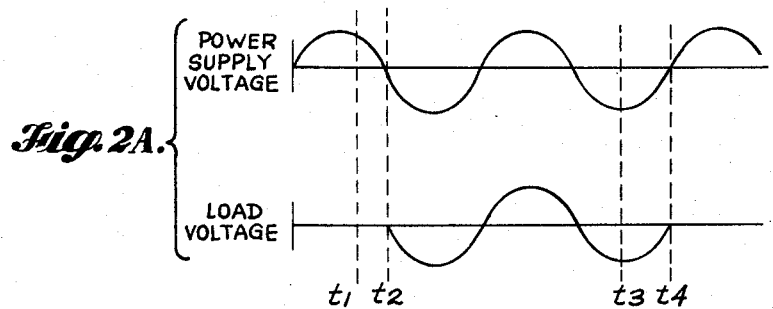
FIGURE 2A is an illustration of the power supply and load voltage wave-forms of FIGURE 2.

The operation of the circuit of FIGURE 2 is similar to that set forth above with regard to FIGURE 1 insofar as the operation of switch 30 to its ON position at time $t_1$ in FIGURE 2A and to its OFF position at time $t_3$. In the embodiment of FIGURE 2, however, by having the gating signals independent from the voltage on the anode of SCR 20, the leakage current of FIGURE 1 is avoided. It will be seen that power for the load 13 is always turned on at a time when the level of the power provided by the supply 10 is at zero and also the power for the load 13 is turned off at sine wave zero regardless of when the switch 30 is transferred between its two positions.

A further advantage of the arrangement of FIGURE 2 is that a variable capacitor 44 is connected in the primary circuit of transformer 40. With the capacitor adjusted to zero or removed from the circuit the above operation takes place. In some load switching applications, however, as set forth hereinafter, it is advantageous to initially provide power to the load 11 at a time when the power voltage is not at zero and to then thereafter have zero turn-off. With the capacitor 44 adjusted to give a 60° lead in the gating voltage applied to SCR's 20 and 25 it is possible to turn power on in the load when the power supply voltage and current are approaching a maximum, at which time the rate of change of current is approaching a minimum. When the load 11 is a transformer primary winding this prevents the generation of the large inductive surge normally associated with initial energization of a transformer having its magnetic circuit polarized in an out-of-phase condition. A further advantage of having the gating signal lead the power supply voltage is that as the SCR 20 is repeatedly gated after the initial turn-on of power to the load, the R.F. noise associated with the repeated SCR turn-on is materially reduced.

Since the zero power detector switches provided in accordance with the present invention are adapted to handle substantial currents and yet prevent the generation of spurious electrical signals normally associated with the opening and closing of conventional switches the teachings of the invention are readily adaptable to various control arrangements wherein a small signal must be used to control substantial power and yet the generation of noise signals avoided. Thus for purpose of illustration there is shown in the embodiment of the invention of FIGURE 3 a light sensitive impedance element such as a light sensitive resistor 55 connected between the anode 26 and gate control electrode 28 of SCR 25. The arrangement of FIGURE 3 is similar to that of FIGURE 2 and like elements bear the same reference numerals. A variable resistor 56 is connected between the gate electrode 28 and the cathode 27 to adjust the level of light intensity at which SCR 25 will be rendered conductive or non-conductive. In the absence of light shining on the resistance element 55 the resistance thereof is relatively high and therefore SCR 25 is maintained nonconductive so that power is applied to the load 13. When light of a given intensity impinges on the resistance element 55 the impedance thereof drops substantially and as a result thereof suitable gating current is applied to the control gate 28 rendering SCR 25 conductive and discontinuing the application of power to the load 13. In each case, as in the embodiments previously described, the switching of power on or off with respect to the load element 13 occurs at a time when the power level of the A.C. supply 10 is at zero. In practice, the embodiment of the invention illustrated in FIGURE 3 is well suited for use as a smoke detection circuit with a source of light normally being focused on the impedance element 55 and the resistor 56 adjusted to cause SCR 25 to normally be conductive. The current limiting resistor 50 is made large to reduce the quiescent power consumption. If the intensity of the light impinging on the element is then changed by a small amount, as for example by smoke being introduced between the source of light and the impedance element 55, the impedance of the element 55 is increased and the normally conducting SCR 25 becomes nonconductive. This removes the clamping action from the gate of SCR 20 and power is applied to the load 11. In practice the load 11 is a suitable alarm which provides an audio and visual indication that smoke or some other object has reduced the intensity of the light being applied to the light sensitive element 55.

When an A.C. power supply must provide substantial current it is found that many presently available controlled rectifiers capable of controlling large currents cause a noise signal to be generated each time the rectifier switches on when in-phase gating is used. It is believed that this noise is caused by the fact that for the SCR to become conductive the voltage on the gate must reach a level higher than the normal voltage drop across the SCR when it is conducting. With some SCR's the gating voltage is several volts whereas the voltage drop across the SCR when conducting is a few tenths of a volt. As a consequence, when the SCR becomes conductive as a result of an in-phase gate signal there is a sudden drop in the voltage across the SCR. This gives rise to an interference or disturbance of the power applied to the load. These recurring disturbances can cause severe problems when the system is being used in an aircraft. As indicated in FIGURE 2 this problem can be overcome through the use of leading gate signals obtained in the manner illustrated.

In applications wherein very heavy currents are to be handled, the embodiment of the invention illustrated in FIGURE 4 is particularly advantageous. As described in detail hereinafter, the embodiment illustrated in FIGURE 4 can advantageously include substantially the entire circuit of FIGURE 2 to provide selected control for the initial application of power to a load.

Figure 4A:
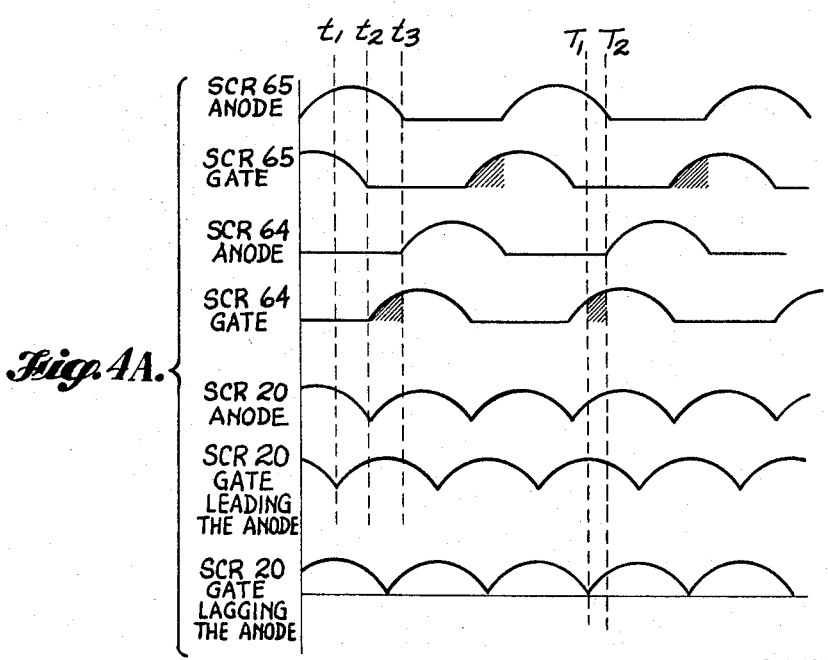
FIGURE 4A is a graph of voltages plotted versus time for the gates and anodes of two main power control SCR's shown in FIGURE 4 as well as for the anode of a gating control SCR with two voltage wave-forms for the gate of the gating control SCR.

In FIGURE 4, an A.C. power supply 60, having first and second output leads 61 and 62 is provided for supplying A.C. power to a given load 63. A pair of heavy-duty SCR's 64 and 65 are connected in series circuit between the power supply 60 and the load 63 with the SCR's 64 and 65 being oppositely poled. Their respective gate electrodes 66 and 67 are connected through the diodes 68 and 69 to the secondary windings 70 and 71 of the gating transformer 72. The windings 70 and 71 are so wound that one or the other of the SCR's 64 or 65 will be provided with gating current when current flows in one direction or the other through the primary winding 73 of the transformer 72. A variable capacitor 74 is connected in series circuit between the power supply terminal 61 and the end 73A of primary winding 73. When the opposite end 73B of the transformer primary winding is connected to power supply ground (in the manner hereinafter indicated), leading gate signals will be applied to SCR's 64 and 65. This will be seen most clearly from the first four wave-forms shown in FIGURE 4A. The voltages on the anodes of SCR's 64 and 65 are shown only for the periods when they are positive in order to more clearly teach the invention. For purpose of illustration and teaching the present invention, the capacitor 74 will be considered to be adjusted so that the voltage applied to gates 66 and 67 leads by 60 degrees the positive voltage applied to the anodes of SCR's 64 and 65. Thus it will be seen from the first four wave-forms of FIGURE 4A that when the end 73B of the transformer primary winding 73 is connected to ground the gate electrodes 66 and 67 will be provided with gating current 60 degrees ahead of the time when the associated SCR anode becomes positive with respect to its cathode. Therefore at the time when the anode becomes positive with respect to its cathode the SCR will have already been preconditioned for conduction and the normally associated noise caused by initiation of conduction is eliminated.

In some applications it is desirable to provide initial flow of current to the load 63 at a time when the rate of change of power supply voltage is near a minimum. In other applications it is desirable to have the initial turn-on when the power supply voltage is zero to prevent generation of noise at turn-on. In each of the two applications it is advantageous to avoid the noise associated with repeated in-phase gating of the power SCR's following initial turn-on of the circuit. For this purpose, the circuit of FIGURE 2 works well with the circuit thus far described in FIGURE 4. Therefore it will be seen in FIGURE 4 that within the dashed lines the circuit corresponding in general to the circuit of FIGURE 2 is used for selectively controlling the flow of current through the transformer primary winding 73. The end 73B of the transformer primary winding is connected to the full-wave rectifier arrangement provided by the diodes 14–17. The other components of the circuit of FIGURE 2 used in FIGURE 4 bear their same reference numerals and operate in general in the manner explained above. Thus it will be seen that the state of the SCR 20 will control the flow of current through the transformer primary winding 73 and hence will serve to control the application of gate signals to the main power SCR's 64 and 65. A variable resistor 75 (generally of several thousand ohms) is connected between the end 73A of the transformer primary winding 73 and power supply ground. Thus even at times when the SCR 20 is not conductive a small amount of current will be passed by capacitor 74 to maintain the desired leading voltage on the anode of SCR 20 and to maintain primary winding 73 in the proper phase relationship at all times for immediate application of gate signals to the SCR's 64 and 65 in the manner hereinafter described. A high impedance resistor 77 may advantageously be connected across the diode bridge of diodes 14–17 so that a very small sustaining current flows through primary winding 73. Such sustaining current is not sufficient to gate on either 64 or 65. In the fifth waveform of FIGURE 4A the voltage on the anode of the SCR 20 is shown as leading the power supply voltage by approximately 60 degrees. As long as the SCR 20 is maintained in a nonconductive condition, there will be no gating signals for the SCR's 64 and 65 and no power will be applied to the load 63.

If the load 63 is an inductive load such as a transformer, it may be desirable to provide current to the load at a time when the rate of change of power supply voltage is at or near a minimum, as for example, at the time $t_1$ in FIGURE 4A. In such an application of the circuit of FIGURE 4 the gate signals applied to the SCR 20 are made to lead the voltage on the anode of the SCR 20. This is indicated by the sixth voltage wave-form in FIGURE 4A. For purpose of illustration and with reference to the sixth wave-form it is assumed that the capacitor 44 has been adjusted so that the voltage on the anode of the SCR 25 (which corresponds to the voltage applied to the gate of SCR 20) leads the anode voltage of SCR 20 by approximately 60 degrees. Since the anode of SCR 20 is leading the power supply voltage by 60 degrees, this might also be considered as having the voltage on the anode of SCR 25 and on the gate of SCR 20 lagging the power supply voltage by approximately 60 degrees (or leading by 120 degrees). Due to the full-wave rectification provided by diodes 43, 45, 46, and 49 and of diodes 14–17, the timing of the anode and gate voltages will be as shown in the fifth and sixth waveforms of FIGURE 4A, with the voltage of gate 23 of SCR 20 being referred to as leading the anode voltage. It should be noted that with switch 30 in its OFF position SCR 25 is repeatedly provided with gating signals and therefore, (as described above), the gate of SCR 20 is not provided with sufficient voltage to cause conduction of the SCR 20 and no power is applied to the load 63.

Assuming that the switch 30 is moved to its ON condition at some time just prior to time $t_1$ in FIGURE 4A, it will be seen that the SCR 25 will remain conductive until time $t_1$. Then at time $t_1$ SCR 25 turns off and as the voltage provided by transformer 40 starts to depart from zero the SCR 20 will be provided with a gating signal. Since the anode 21 is at that time positive, SCR 20 becomes conductive. Therefore current flows through the primary winding 73 and since the anode of SCR 65 is positive at time $t_1$, the SCR 65 immediately becomes conductive and power is supplied to the load 63 at a time when the power supply $dv/dt$ is near a minimum. At time $t_2$ the gate voltage for SCR 65 terminates but since the anode of SCR 65 is still positive SCR 65 remains conductive. Starting at time $t_2$ it will be seen that power is applied to the gate of SCR 64 so that when the anode of SCR 64 starts to go positive at time $t_3$ as the main power supply voltage crosses the zero reference axis, the SCR 64 will immediately become conductive. The cross-hatched area under the SCR's 64 and 65 gate wave-forms shows the time during which the associated SCR is being provided with gate current prior to the anode of the associated SCR becoming positive. It will be seen that the conditions necessary for repeated turn-on of the SCR's 64 and 65 as the power supply voltage crosses the zero reference axis will take place with the SCR's 64 and 65 being preconditioned by the early application of gating signals thereto. With the SCR 20 gate voltage leading the voltage on its anode 21 power is thus initially applied to the load 63 at a selected time on the main power supply voltage wave-form, regardless of when the switch 30 is moved from its OFF position to its ON position, and then thereafter the SCR's 64 and 65 are repeatedly rendered conductive without the generation of noise.

In other applications it is desirable to have a zero turn-on of power to the load 63 regardless of when the switch 30 is moved to its ON condition. Therefore, for purpose of illustration, in the bottom wave-form of FIGURE 4A, the voltage on the gate of the SCR 20 is shown as lagging by several degrees the voltage on the anode of SCR 20 and leading the power supply voltage. This condition is obtained by adjustment of the capacitor 44. While the exact adjustment of the relative phase relationship is not critical, it is preferable that the voltage on the gate of SCR 20 lag the voltage on the anode by several degrees and lead the power supply voltage by several degrees. This is illustrated in FIGURE 4A wherein it will be seen in the bottom wave-form that the voltage of the SCR 20 gate is at zero at some time between times $t_2$ and $t_3$ which correspond respectively to the times when the anode of SCR 20 is at zero and when the power supply voltage crosses the zero axis. Since power SCR gating is initially provided to the SCR's only at a time when the bottom wave-form is at zero it will be seen that regardless of when the switch 30 is moved to its ON position power will be initially applied to the load 63 at a time when the main power supply voltage is crossing the zero reference axis. For example, if the switch 30 is moved to its ON position at any time during the half cycle preceding $T_1$ and when the anode of SCR 65 is positive, it will be seen that SCR 25 will have already been rendered conductive and therefore SCR 20 will not be turned on. Then at time $T_1$ when the SCR 20 starts to conduct gating current is provided to the gate of SCR 64, at which time the anode of 64 is negative and the anode of SCR 65 is positive. Therefore power is not applied to the load until time $T_2$ as the anode of SCR 64 starts to go positive. Since by time $T_2$ the SCR 64 has already been provided with a gating voltage the SCR 64 will turn on immediately at time $T_2$ and cause power to be provided to the load 63. Then thereafter it will be seen that the conditions are proper for repeated turn-on of the SCR's 64 and 65 for noiseless application of power to the load 63.

The impedance of the resistor 75 is relatively high so that the operation of the SCR 20 is not impaired. In one circuit constructed in accordance with the teachings of the present invention, the resistor 75 was set at 3300 ohms, capacitor 74 was set at 1.85 microfarads (for a 60-cycle system) and capacitor 44 was adjusted for leading or lagging signals on the gate of SCR 20 with respect to the anode of SCR 20 depending upon the desired operation (as above described). The transformers 40 and 72 preferably have C type cores which are in effect high leakage air gap cores.

POWER TRANSFER SYSTEM

The teachings of the present invention may be used to advantage in providing a much-improved power transfer system for permitting substantially noiseless transfer of power to a load from one power supply to another. There is shown for purpose of illustration in FIGURE 5 an improved power transfer system for transferring power from a ground power supply to an aircraft internal power supply. It is common practice to make use of ground power units for supplying electrical energy to an airplane during the time that the plane is on the ground. This avoids the necessity of maintaining at least one of the aircraft engines running for supplying power to the various computers and other electrical equipment in the airplane during the time that the plane is on the ground. It has been found in the past that when power is later to be provided by the internal power-generating equipment of the aircraft at takeoff, the transfer from the ground power unit to the airplane power supply results in the generation of electrical transients. These transients have been found to cause disruption of the operation of sensitive equipment in the airplane to the point where it has frequently been necessary to effect the transfer from the ground power unit to the airplane power supply well in advance of the airplane takeoff so that the various systems in the aircraft can be readjusted to correct for the errors introduced by the power transfer transients.

Figure 5:
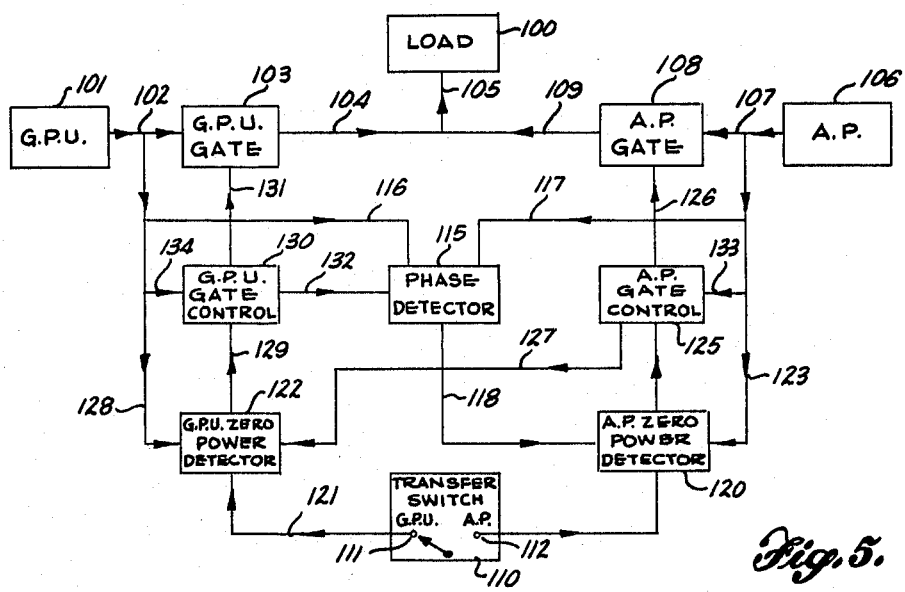
FIGURE 5 is an overall block diagram illustrating the various components of an improved power transfer system provided in accordance with the present invention.

In FIGURE 5 a load 100 represents the various electrical loads in an airplane. A ground power unit labeled G.P.U.

101 has an output circuit 102 which is controlled by the ground power unit current gate 103 so that power can be supplied over the lead 104 to the aircraft load lead 105. An airplane power supply labeled A.P. 106 is adapted to provide current to the aircraft load 100 through the airplane current supply leads 107 and 109 having the airplane current gate 108 connected in series circuit therewith for controlling the flow of current from the airplane power supply 106 to the load 100. A power transfer switch 110 is illustrated for controlling which of the two power supplies is to provide current to the load 100. The power transfer switch 110 is shown as having a ground power unit ON position 111 and an airplane power ON position 112 with power being provided by one system or the other depending upon the position of switch 110. Every effort is made to have the frequency of the power provided by the ground power unit 101 exactly equal to the frequency of the power provided by the airplane power supply 106. In practice it is found that working with the usual 400 c.p.s. supplies the frequency of the two supplies may vary by as much as a few cycles per second. To enhance the system operation and avoid interruption of the operation of the various electronic and electrical systems within the airplane, the transfer from ground power to aircraft power is made at a time when the two supplies are in phase. Thus a phase detector 115 is connected by leads 116 and 117 to the output circuits of the ground power unit 101 and the airplane power supply 106. When the power supply voltages are in phase the phase detector output signal goes to a minimum and in response thereto an appropriate signal is provided by the signal output circuit 118 from the phase detector 115 to an airplane zero power detector circuit 120 to permit turn-on of the airplane power when the airplane power supply voltage passes through zero.

The system of FIGURE 5 will be described starting with the condition wherein the power transfer switch 110 is initially in its ground power unit position 111 and with the ground power unit 101 providing A.C. power to the aircraft load 100 through the current gate 103. When the power transfer switch is moved to its air power position 112 the circuit 121 extending from the transfer switch 110 to a ground power unit zero power detector circuit 122 is preconditioned for turning off of the ground power unit but at this instant in time the ground power unit is not in fact disconnected from the load. When the switch 110 is in its air power position 112 the air power zero detector switch 120 is conditioned for receipt of a phase signal from the phase detector 115. The A.P. zero power detector circuit 120 will also be seen to be connected by the lead 123 to the output from the A.P. supply 106. The arrangement is such that when the A.P. supply voltage passes through zero and the phase detector provides a signal indicating conincidence between the G.P.U. and A.P. supplies, the zero power detector 120 operates the A.P. gate control 125 (connected by 133 to A.P. supply 106) which in turn applies a control signal by lead 126 to the A.P. gate 108 rendering A.P. gate 108 conductive. Therefore at this instant the A.P. supply 106 is effectively connected to the load 100. It should be noted that at this instant in time both of the power supplies are providing power to the load 100, but since the phase detector 115 has indicated that the two are in phase, there is no disruption in the power applied to the load 100 nor is there any noise signal generated.

The turning on of the A.P. gate control 125 also serves to provide an enabling signal on the lead 127 which will be seen to be connected to the ground power unit zero power detector 122. The G.P.U. zero power detector 122 is connected by the lead 128 to the G.P.U. output lead 102 so that when the ground power unit voltage next passes through its zero reference axis the detector 122 will provide a signal on its output lead 129 to the ground power unit gate control 130 which in turn applies an appropriate signal via its output lead 131 to the ground power unit current control gate 103 turning that gate off. As a result thereof current is no longer provided by the ground power unit and the load has been transferred from the ground power unit to the airplane supply. At the same time as the ground power unit gate 103 is being opened the gate control 130 applies a command signal via the lead 132 to the phase detector 115 to cause the phase detector to discontinue its output of information regarding the phase relationship between the two supplies.

From the above it will be seen that power for the load 100 was initially supplied by a ground power unit and subsequently by the aircraft power supply with the transfer between the two power supplies having been made without any interruption in the power provided to the load. The system provides connection of the aircraft power supply to the load at a time when the power provided by the airplane power supply is crossing a zero reference axis and turn-off of the ground power unit at a time when its output power is crossing a zero reference axis. As a result, the usual transients generated by such a power transfer are eliminated. It should be noted that the connection between the A.P. gate control 125 and the G.P.U. zero power detector 122 is a self-regulating internal control arrangement which prevents turn-off of the ground power until the airplane power is turned on. Therefore any time delay associated with the turn-on of the aircraft power current gate even though very small and in the order of microseconds, causes no noise to be generated. The result is that the two power supplies are paralleled for approximately one-half of a cycle with such paralleling occurring at a time when the power supplies are substantially in phase.

Figure 6:
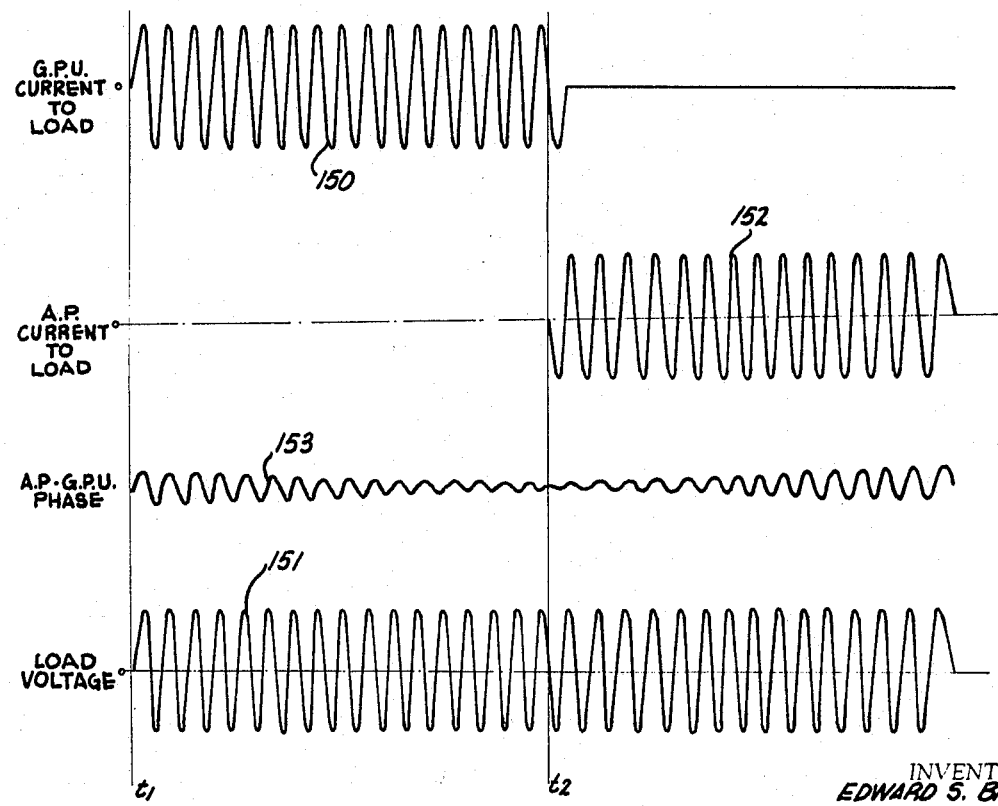
FIGURE 6 is an illustration of various current and voltage wave-forms in the power transfer system of FIGURE 5.

In FIGURE 6 the ground power unit current, the airplane power current, a signal proportional to the airplane-ground power unit phase relationship, and the load voltage as seen by the aircraft load 100 are illustrated. Referring now to FIGURE 6 it will be seen from the left-hand portion of the G.P.U. current wave-form 150 that initially the load is being provided with power from the G.P.U. The aircraft power supply 106 is in operation during the time that the ground power supply is providing current to the load but since the gate 108 is open the current from the aircraft power supply is not provided to the load. Assuming the power transfer switch 110 is moved to its position 112 at time $t_1$ it will be seen that since the phase signal 153 indicates the two supplies are out of phase the transfer does not occur even though the output voltage from each supply crosses the zero axis. At time $t_2$ when the aircraft power supply and the ground power unit are in phase the phase detector signal goes to zero and thus enables the A.P. zero power detector 120 so that as the airplane and ground power voltages cross the zero reference axis in phase the zero power detector switch 120 renders the gate 108 operable. Thus the closing of the gate 108 has occurred at a time when the phase relationship between the ground power unit and the aircraft power units are substantially in phase even though there is a slight frequency difference between the two. As indicated by the load voltage wave-form 151, there is no interruption in the power applied to the load 100 at the time when the aircraft power supply is switched on. The load is then provided simultaneously with current by the two power supplies for one-half cycle until at the next crossing of the zero reference axis by the current from the ground power unit the ground power unit zero power detector 121 serves to open the ground power unit gate 103 and disconnect the ground power unit from the load. It should be noted that if the two supplies are exactly in phase as they cross the zero reference axis at time $t_2$ and if the power detectors, gate controls, and current gates were extremely fast acting, the power transfer might occur with the ground power being disconnected at time $t_2$ and without the two supplies being paralleled for one-half cycle. However as described hereinafter with reference to a preferred circuit arrangement, the paralleling of the two supplies for one-half cycle makes certain that there is no noise associated with the transfer, even in those cases where the two supplies are a few microseconds out of phase when their voltages are crossing the zero reference axis.

Figure 7:
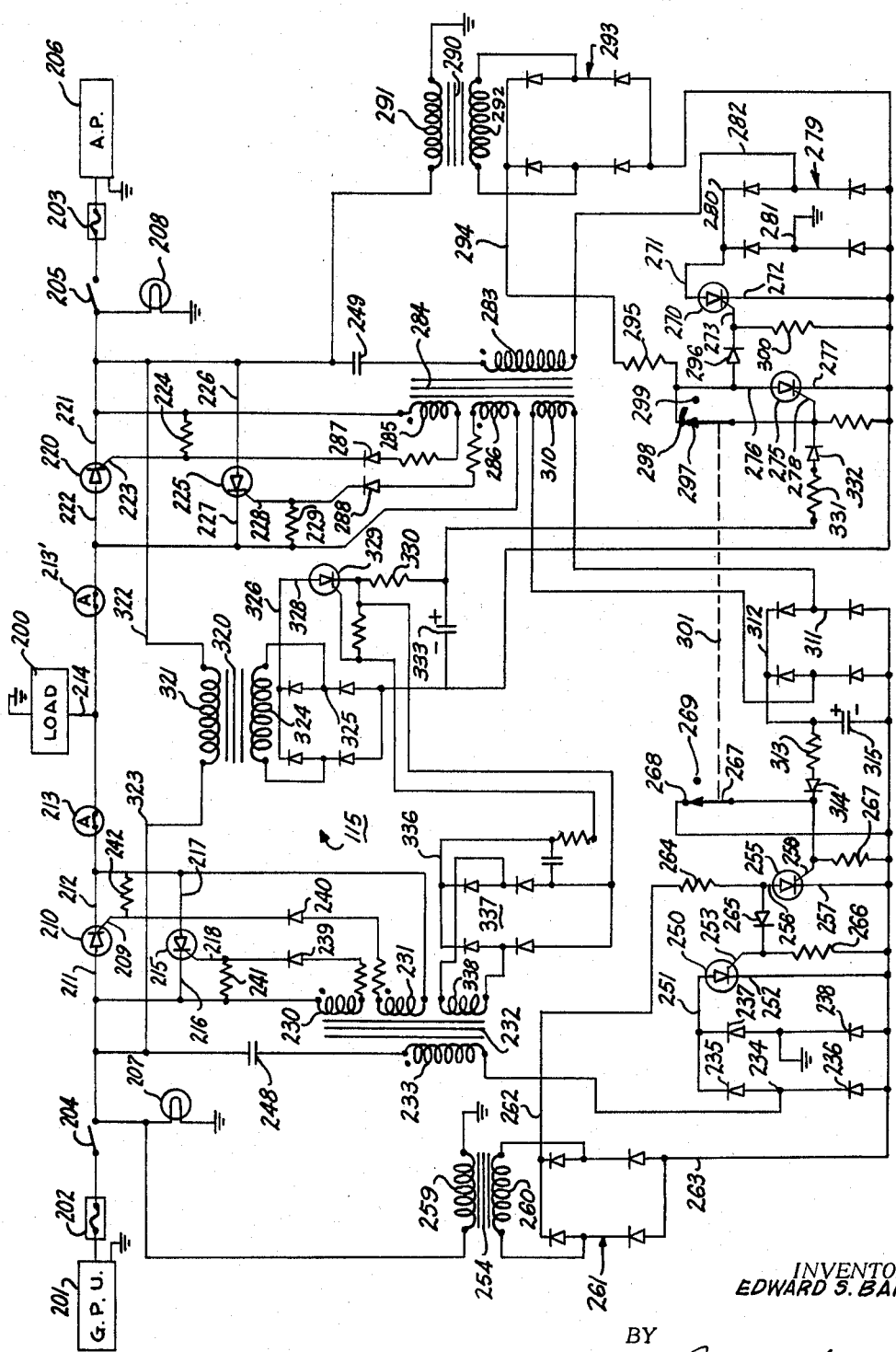
FIGURE 7 is a schematic circuit diagram of the details of a power transfer system such as that illustrated in block diagram in FIGURE 5.

While various types of current control elements such as thyratrons or silicon controlled rectifiers (SCR's) can be utilized for carrying out the teachings of the present invention as illustrated in FIGURE 5 for switching a load from one A.C. power supply to another, there is shown for purpose of illustration in FIGURE 7 one circuit arrangement constructed in accordance with the teachings illustrated in FIGURE 5 and making use of zero power detector switches such as those heretofore described.

In FIGURE 7 a load indicated at 200 is adapted to be selectively provided with energy by the ground power unit 201 or by the airplane power supply 206. A conventional fuse 202 is connected in the output circuit from the ground power unit 201 and in a similar manner a conventional fuse 203 is connected in the output circuit from the airplane power supply 206. The switches 204 and 205 respectively connected in the output circuits of the two power supplies are both closed prior to the time that power transfer is to be made and in connection therewith the indicating elements 207 and 208 are connected between the output circuits of the power supplies and signal ground to indicate whether or not the respective power supplies are working properly. A first controlled rectifier shown as an SCR 210 has its anode connected to the output circuit of the ground power unit and its cathode connected through an ammeter 213 to the input circuit 214 of the load 200. In a similar manner a second SCR 215 has its cathode 216 connected to the ground power unit 201 and its anode 217 connected to the load 200 so that full-wave voltage is provided by the ground power unit 201 to the load.

In an arrangement substantially identical to that provided for the ground power unit the circuit between the aircraft power supply and the load 200 includes the SCR's 220 and 225 having anodes 222 and 226 and cathodes 221 and 227 respectively so that when the aircraft power supply is operable and the two SCR's 220 and 225 are alternately conductive full-wave power will be applied to the load 200. A second ammeter 213' is shown in circuit with the airplane power supply for monitoring the current therefrom to the load.

The current gating provided for the SCR's 210 and 215 is controlled by the gate control network which includes the secondary transformer windings 230 and 231 wound upon the transformer 232 having a primary winding 233 which is connected directly to the output circuit of the ground power unit and to the positive terminal 234 of a bridge rectifier provided by the diodes 235–238. The secondary windings 230 and 231 will be seen to be respectively connected through the diodes 239 and 240 to the current gate electrodes 218 and 209 of the SCR's 210 and 215, said windings 230 and 231 being so wound that when current flows into the dotted end of the primary winding 233 current flows out of the dotted end of the winding 231 to gate SCR 210. Similarly the flow of current out of the dotted end of the winding 233 results in current flow from winding 230 to the gate electrode of SCR 215. In the absence of current flow through the primary winding 233 it will be seen that neither of the two SCR's 210 or 215 can conduct current. Appropriate bias impedance elements shown as resistors 241 and 242 will be seen to be respectively connected between the control electrode and cathode circuits of the SCR's 210 and 215.

The control of current through the primary winding 233 is maintained by the ground power unit zero power detector which includes the SCR's 250 and 255 having anodes 251 and 256, cathodes 252 and 257 and gate electrodes 253 and 258 respectively. Information regarding the condition of the output power provided by the ground power unit 201 for the zero power detector is provided by a second transformer 254 having a primary winding 259 connected between the ground power unit output terminals and a secondary winding 260 connected to a full-wave rectifier 261 having a positive terminal 262 and a negative terminal 263 for providing power to the zero power detector which includes SCR's 250 and 255. To this end it will be seen that the positive terminal 262 is connected through a resistor 264 to the anode 256 of SCR 255 and also through the diode 265 to the control gate 253 of SCR 250. Suitable bias resistors 266 and 267' will be seen to be connected between the current gates 253 and 258 of the SCR's 250 and 255 and the negative terminal 263 of the full-wave rectifier circuit 261.

A ground power unit control switch 267 has a ground power unit ON position 268 and an OFF position 269, the ON position 268 being such that the switch 267 directly connects the negative terminal 263 of the full-wave rectifier 261 to the gate electrode 258 of the SCR 255. Therefore the SCR 255 is normally made nonconductive with the switch 267 in its ground power unit ON position 268 as indicated in FIGURE 7. Since the SCR 255 is thereby maintained nonconductive the positive voltage provided by the full-wave rectifier 261 will be applied via the resistor 264 and diode 265 to the gate electrode 253 of SCR 250 and hence with the switch 267 in the position indicated the SCR 250 will be rendered conductive during each of the two half cycles of the ground power unit 201. As a result thereof primary current flow will be maintained through the primary winding 233 of the first transformer 232 and hence appropriate gating signals will be provided on the control gates of the SCR's 210 and 215. A timing capacitor 248 may advantageously be included in the circuit of the primary winding 233 to reduce R.F. interference in the manner previously described with reference to FIGURE 4.

The zero power detector circuit for the airplane power supply is similar to that described for the ground power unit and will be seen to include the SCR's 270 and 275 having anodes 271 and 276, cathodes 272 and 277 and control gates 273 and 278, respectively. A full-wave rectifier 279 comprised of four diodes provides positive potential on the lead 280 for the SCR 270, an intermediate point in the bridge rectifier circuit 281 being grounded in a manner analogous to that in the full-wave rectifier which includes the diodes 235–238 for the ground power unit zero power detector. The full-wave rectifier 279 is connected by lead 282 through the primary winding 283 of a third transformer 284 to the nongrounded side of the airplane power supply unit 206. Secondary windings 285 and 286 on the transformer 284 are respectively connected through appropriate matching impedance elements and the diodes 287 and 288 to the control gate electrodes 223 and 228 of the airplane power supply current gate SCR's 220 and 225. The impedance of the respective gates is reduced by the associated bias resistors 224 and 229 connected between the gate electrodes and their associated cathodes. The arrangement is such that when current flows through the primary winding 283 in one direction or the other the appropriate one of the SCR's 220 or 225 is rendered conductive so that full-wave power will be provided from the airplane power supply 206 through the SCR's 220 and 225. A second timing capacitor 249 is advantageously connected in series circuit with the primary winding 283 to cause the gate voltages to lead the power supply voltage by approximately 60° in the manner previously described.

The SCR 270 is provided with information regarding the phase of the airplane power supply voltage by means of a fourth transformer 290 having a primary winding 291 connected across the output of the airplane power supply 206 and a secondary winding 292 connected to the bridge rectifier circuit 293. A positive terminal 294 of the rectifier circuit 293 is connected through the resistor 295 to the anode 276 of SCR 275 and further through the diode 296 to the gate electrode 273 of SCR 270. A control switch 297 having contacts 298 and 299 is connected directly to the gate electrode 278 of SCR 275 with the contact 298 being directly connected to the anode 276 of SCR 275. The arrangement is such that with the switch 297 in its position of engagement with contact 298 the positive potential provided by full-wave rectifier 293 will be applied directly to the gate 278 of SCR 275 and hence the SCR 275 is normally maintained conductive on each half cycle of the power output provided by the airplane power supply 206. As long as the SCR 275 conducts it acts as a voltage clamp on the gate electrode 273 of SCR 270 to prevent turn-on of the SCR 270. An impedance element shown as resistor 300 is connected directly between the cathode of diode 296 and the cathodes of SCR's 270 and 275. In practice it is found that the anode-to-cathode voltage drop across an SCR 275 is lower than the few tenths of a volt drop normally associated with a germanium or other similar type semiconductor diode 296 and hence such diodes are advantageously used as the diodes 296 and 265 in FIGURE 7.

Since the switches 267 and 297 are ganged as indicated in FIGURE 7 for operation by a single movement there is shown for purpose of illustration a dotted line 301 which connects the two switches 267 and 297. To make certain that the switch 267 is removed from its point of contact 268 prior to the time that the switch 297 is removed from its contact 298, the contact 298 is shown for purpose of illustration as being elongated to ensure opening of switch 267 prior to the opening of switch 297. The reason for this is that the zero power detector switch for the ground power unit should be placed in a condition for detection of a zero output in the ground power unit at the same time as or slightly prior to the time that the aircraft power supply zero detector is rendered operable.

With the arrangement thus far described it will be seen that the ground power unit 201 is providing power to the load 200 and that due to the continued conduction of the SCR 275 the gate electrodes 223 and 228 of SCR's 220 and 225 are prevented from having any gating current applied thereto. It will also be seen that if the switches 267 and 297 are changed to their positions of engagement respectively with contacts 269 and 299 the SCR 255 will be in a condition for conduction under the conditions specified hereinafter and the SCR 275 will be conditioned for nonconduction. It should be noted however that even though the switches 267 and 297 are moved to their positions of engagement with contacts 269 and 299 the previously nonconductive SCR 255 is not immediately rendered conductive nor is the previously conductive SCR 275 rendered immediately nonconductive. That is, it will be seen that at this instant in time there is no gating signal applied to the gate control electrode 258 of the SCR 255 to initiate conduction thereof. Since the SCR 275 may at the time of movement of switch 297 be conducting it will remain conducting until the anode voltage thereon is reduced to zero. Furthermore, as discussed below, the phase relation between the two power supplies is of importance and serves as a further control at this time. Thus it will be seen that the transfer of the switches 267 and 297 serves primarily as a conditioning of the system for the power transfer which then takes place automatically.

Assuming for the moment that the system does not include the phase detector and associated control described hereinafter, the manner in which the power for the load is transferred from the ground power unit to the airplane power unit will now be described. Assuming the switches 267 and 297 are moved to engage the contacts 269 and 299 prior to the time $t_2$ in FIGURE 6, then when the airplane power supply voltage crosses the zero reference axis at time $t_2$ it will be seen that SCR 275 will become nonconductive. The positive potential provided by the full-wave rectifier 293 will therefore be applied through the diode 296 to the gate electrode 273 of SCR 270 and hence the SCR 270 will become conductive and current will flow through the primary winding 283 of transformer 284. This current flow will induce an appropriate signal in one or the other of the secondary windings 285 or 286 so that the appropriate one of the SCR's 220 or 225 will be rendered conductive for that half of the cycle of the aircraft power supply. Therefore at this instant in time (that is, when the power level departs from the crossing of the zero reference axis) the aircraft power supply 206 is providing power to the load 200.

It will be seen that the transformer 284 has a third secondary winding 310 thereon which is connected by appropriate leads to a full-wave rectifier circuit 311 having a positive terminal 312 which is connected through a resistor 313 and a diode 314 to the gate electrode 258 of the SCR 255. A filtering capacitor 315 is connected across the full-wave rectifier circuit 311. The arrangement is such that regardless of the direction of current flow through the primary winding 283 a positive signal will be applied to the gate electrode 258 of the SCR 255. Since the anode 256 of SCR 255 is connected to the positive terminal of the full-wave bridge rectifier 261 it will be seen that when the SCR 255 has such positive signal applied to its gate electrode the SCR 255 will become conductive. However at this time it will be seen from the wave-forms in FIGURE 6 that the SCR 250 is already conductive and hence even though the SCR 255 becomes immediately conductive it has no effect on the SCR 250. When the output voltage of the ground power unit 201 next crosses the zero reference axis at time $t_3$ the voltage on the anode 251 of SCR 250 is reduced to zero and hence the SCR 250 is rendered nonconductive. Since the SCR 255 is now being provided with a positive signal on its gate electrode 258 from the transformer winding 310, the SCR 255 remains conductive and hence clamps the gate electrode 253 of the SCR 250 against receiving a positive gate signal. As a result SCR's 210 and 215 receive no further gate signals and the ground power unit is turned off or disconnected from the load 200 as the power output from the ground power unit reaches the zero reference axis at time $t_2$ in FIGURE 6.

From the above it will be seen that the system thus far described operates to transfer power between the two supplies with power turn-on and turn-off occurring at zero voltage. The system further includes means for having the power transfer occur when the ground power unit and airplane power supply are in phase. In FIGURE 7 the phase relationship between the ground power unit 201 and the aircraft power supply 206 is monitored by means of a transformer 320 having a primary winding 321 which is connected by lead 322 to the nongrounded terminal of the power supply 206 and by lead 323 to the nongrounded lead of the ground power unit 201. Thus, as is well known in the art, the amplitude of the voltage provided across the secondary winding 324 of the transformer 320 will be dependent upon the phase relationship of the two power supplies 201 and 206 (the amplitude of the voltage of the two supplies being substantially identical). As long as the two power supplies 201 and 206 are substantially out of phase a substantial amount of current will flow in the primary winding 321 and hence a substantial voltage will be developed in the secondary winding 324. A full-wave rectifier 325 is connected across the secondary winding 324 and has the positive terminal 326 thereof directly connected to the anode 328 of an SCR 329 having its cathode connected through resistors 330 and 331 and through the diode 332 to the gate electrode 278 of SCR 275. A filtering capacitor 333 serves to maintain the SCR gate 278 positive as long as there is any substantial current flow through the SCR 329 from the transformer 320. The SCR 329 has its gate electrode connected to the positive terminal 336 of a full-wave bridge rectifier 337 connected across a third secondary winding 338 on the transformer 232 which as previously described has its primary winding 233 controlled by the SCR 250 in the ground power unit zero power detector circuit. The arrangement is such that as long as the SCR 250 is conductive and current flows through the primary winding 233 of transformer 232 an appropriate positive gating signal will be applied to the gate control electrode of the SCR 329 and hence the phase detector circuit will be in a condition for controlling the SCR 275 in the aircraft power zero power detector circuit.

Assuming the condition wherein the ground power unit is providing energy to the load 200 it will be seen that the SCR 329 is repeatedly provided with a positive gating signal on its gate control electrode. Therefore as long as the ground power unit and the aircraft power supply are substantially out of phase a suitable voltage will be induced in the secondary winding 324 and applied through the SCR 329 to the control electrode 278 of SCR 275 thereby maintaining SCR 275 in a conductive condition even though the switch 297 is transferred to its position of engagement with the contact 299 at time $t_1$ in FIGURE 6. Then as indicated in the third wave-form of FIGURE 6 when the two power supplies are substantially in phase at time $t_2$ the voltage induced in the secondary winding 324 will be reduced to a minimum. When this occurs the positive gating signal for the SCR 275 will no longer be provided by the transformer 320. Since at this time the switch 297 is in its position of engagement with contact 299 the SCR 275 will become nonconductive as the output power from the aircraft power supply 206 passes through its zero axis at time $t_2$ which corresponds also to an in-phase crossing of the zero axis by wave-forms 150 and 151. Then as the voltage across the output terminals of the supply 206 increases the SCR 270 will become conductive since the SCR 275 no longer acts as a voltage clamp to prevent the conduction thereof. Conduction of SCR 270 permits current flow through the primary winding 283 and hence the application of gating signals for the power SCR's 220 or 225. Such current through the primary winding 283 also provides a positive signal on SCR 255 in the ground power zero detector. The capacitor 315 normally produces sufficient delay so that SCR 250 is already conducting by the time SCR 255 turns on and hence the two supplies are in parallel for the half cycle between times $t_2$ and $t_3$, the ground power being "turned off" at $t_3$.

After the power transfer has occurred and the aircraft power supply is providing the required power for the load 200 it will be seen that the continuing current flow through the transformer primary winding 283 will serve to continually provide a positive gate signal for the gate electrode 258 of SCR 255 and hence the SCR 250 will no longer be conductive. Even though the frequency of the two supplies is slightly different the capacitor 315 assures a continued gate signal on SCR 255 as the phase relation of the supplies changes. Since the transformer 232 no longer provides gating signals for the SCR's 210 and 215 the power transfer is completed. To prevent the phase detector circuit from continuing to detect the phase relationship between the two power supplies and thereby cause reconduction of the SCR 275, the phase detector output is interrupted. Since conduction of the SCR 250 prevents further voltages from being induced in the secondary winding 338 of the transformer 232 the SCR 329 connected in series circuit between the full-wave rectifier circuit 325 and the gate electrode 278 of SCR 275 will no longer receive gating signals. Thus the phase detector no longer has any control over the SCR 275.

While the power transfer system has been described with reference to FIGURES 5 and 7 as being usable for transferring power from a ground power unit to an internal aircraft power supply, the system is adapted for use in transferring power between any two A.C. power supplies.

There has thus been disclosed an improved zero power detector switch having the ability to turn the power on and off for a given load at times when the power level of an A.C. power supply is crossing the zero reference axis. In addition, there has been disclosed specific circuit arrangements for reducing the noise level normally associated with the repeated turning on and turning off of silicon controlled rectifiers in current control circuits. There has also been disclosed an improved power transfer system for eliminating transients when transferring power from one A.C. supply to another. While the invention has been disclosed with reference to specific embodiments for purpose of illustration, it is to be understood that such illustrations are for teaching the invention only and that those modifications which will be obvious to a person skilled in the art from the teachings hereof are to be encompassed by the following claims.

What is claimed is:

1. A control circuit comprising in combination: first and second current control devices each having first and second load electrodes and a control electrode and each being rendered conductive only by the simultaneous occurrence of a first signal on its first and control electrodes and thereafter being rendered nonconductive only by the absence of said first signal on its said first electrode; first load means; power supply means connected to said first and second electrodes of said first device through said load means and adapted to periodically provide first signals to said first electrode of said first device; first circuit means connecting said first electrode of said second device to said control electrode of said first device; means connecting said second electrode of said second device to said second electrode of said first device; second circuit means coupled with said first electrode of said second device for periodically providing first signals thereto; and third circuit means coupled with control electrode of said second device adapted to selectively provide first signals periodically thereto.

2. A control circuit in accordance with claim 1 wherein said first circuit means includes a diode having its anode coupled with said first electrode of said second device and its cathode coupled with said control electrode of said first device.

3. A control circuit in accordance with claim 2 and further including an impedance element connected between the cathode of said diode and said second electrode of said first device.

4. A control circuit in accordance with claim 1 wherein said third circuit means includes switch means having at least two conditions and providing a conductive circuit between said first and control electrodes of said second device which is of a lower impedance than the impedance of said first circuit means when said switch means is in a first condition and is of a higher impedance than the impedance of said first circuit means when said switch means is in a second condition.

5. A control circuit in accordance with claim 1 wherein said second circuit means comprises an impedance element connected between said first electrodes of said first and second devices.

6. A control circuit in accordance with claim 1 wherein said second circuit means includes transformer means having a primary winding connected to said power supply for energization and a secondary winding connected to said first electrode of said second device.

7. A control circuit in accordance with claim 6 and including second load means; a third circuit control device connected between said second load means and said power supply means and having a control electrode; and means responsive to current flow through said first load means to provide a control signal on said control electrode of said third control device.

8. A control circuit in accordance with claim 7 wherein said first load means is an inductor, and further including first and second capacitance means respectively connected in series circuit with said primary winding and said inductor.

9. A control circuit in accordance with claim 1 wherein soid load means includes a first inudctor, and wherein said control circuit further includes: second load means; a third current control device connected between said power supply means and said second load means and having a control electrode; a second inductor in energy exchange relationship with said first inductor; and means connecting said second inductor to said control electrode of said third current control device.

10. A control circuit in accordance with claim 9 and including a capacitor connected in series circuit with said first inductor.

11. A control circuit in accordance with claim 1 and including second load means; a third current control device connected between said power supply and said second load means and having a control electrode; and means connected to said control electrode of said third current control device and coupled with said first load means for providing control signals for said third control device in response to current flow through said first load means.

12. A control circuit comprising in combination: an alternating power supply; a first controlled rectifier having an anode, a cathode, and a control electrode; first load means connected between said power supply and said rectifier and adapted to be energized in response to conduction of said rectifier; a second controlled rectifier having an anode, a cathode, and a control electrode; first circuit means coupled with said power supply and with the anode of said second rectifier; second circuit means coupled with the control electrode of said second rectifier and selectively operable for applying a gating signal thereto; and third circuit means coupled with the control electrode of said first rectifier and with said first circuit means responsive to conduction of said second rectifier to prevent initiation of conduction of said first rectifier and adapted to convey gating signals from said first circuit means to the control electrode of said first rectifier only when said second rectifier is nonconductive.

13. A control circuit in accordance with claim 12 wherein said second circuit means includes switch means selectively operable to connect said first circuit means directly to the control electrode of said second rectifier.

14. A control circuit comprising in combination: first and second controlled rectifiers each having an anode, a cathode, and a control electrode; power supply means connected to the anode and cathode of said first rectifier; first load means connected in circuit between said power supply means and said first rectifier; first circuit means connecting the anode of said second rectifier with the control electrode of said first rectifier; second circuit means connecting the cathode of said second rectifier with the cathode of said first rectifier; third circuit means coupled with said power supply means and with said anode of said second rectifier; and fourth circuit means connected to said control electrode of said second rectifier adapted to selectively provide gating signals thereto.

15. A control circuit in accordance with claim 14 wherein said first circuit means includes a diode having its anode coupled with the anode of said second rectifier and its cathode coupled with the control electrode of said first rectifier.

16. A control circuit in accordance with claim 14 wherein said fourth circuit means includes switch means adapted to selectively connect said anode of said second rectifier to the control electrode of said second rectifier.

17. A control circuit in accordance with claim 14 wherein said fourth circuit means includes a variable impedance means connected between the anode and control electrode of said second rectifier.

18. A control circuit comprising in combination: first and second controlled rectifiers each having an anode, a cathode, and a control electrode and each being of the type which is rendered conductive only in response to the simultaneous presence of a gate signal on the control electrode thereof and a voltage on the anode thereof which is positive with respect to the cathode thereof and then being rendered nonconductive only when the anode voltage becomes equal to or negative with respect to the cathode voltage; a load circuit; alternating power supply means connected to said load circuit through said rectifiers for providing full wave power to said load during the presence of gate signals on said control electrodes; an inductor connected to said power supply means; a third controlled rectifier having an anode-cathode circuit connected in series circuit between said power supply means and said inductor for controlling the flow of current through said inductor; first gating signal circuit means coupled with said control electrodes of said first and second rectifiers and with said inductor and responsive to current flow through said inductor to provide gating signals for said first and second rectifiers; second gating signal circuit means coupled with said power supply means for energization thereby and with the control electrode of said third rectifier; a capacitor connected in series circuit with said inductor, said capacitor and said inductor being adapted to provide leading gate signals to said first gating signal circuit means in response to energization by said power supply means; said second gating signal circuit means comprising a fourth controlled rectifier having an anode coupled with said power supply means for energization thereby, a cathode coupled with the cathode of said third rectifier, and a control electrode; circuit means connecting the anode of said fourth rectifier to the control electrode of said third rectifier; and means selectively operable to connect the anode of said fourth rectifier to the control electrode of said fourth rectifier through a circuit having a resistance lower than the resistance of said circuit means connecting the anode of said fourth rectifier to the control electrode of said third rectifier.

19. A control circuit in accordance with claim 18 wherein said anode of said fourth rectifier is coupled with said power supply through circuit means adapted to provide a selected phase shift between the power supply voltage and the voltage applied to the anode of said fourth rectifier.

20. A power transfer system comprising in combination: first and second alternating power supplies; load means; first normally conductive current control means connected between said first power supply and said load means; second normally nonconductive current control means connected between said second power supply and said load means; power transfer control means having a first and a second condition; first detector means coupled with said second power supply, said second current control means, and with said transfer control means adapted to provide a first control signal to said second current control means in response to said transfer control means being in its said second condition when the voltage of said second power supply reaches a predetermined amplitude; and second detector means coupled with said first power supply and with said first detector means and adapted to provide a second control signal to said first current control means in response to said first signal and to the voltage of said first supply reaching a predetermined amplitude.

21. A power transfer system comprising in combination: first and second alternating power supplies; a load circuit; first normally conductive circuit means connecting said first supply to said load circuit; second normally nonconductive circuit means connecting said second power supply to said load circuit; selectively operable means including a first zero voltage detector coupled with said second supply adapted to render said second circuit means conductive as the voltage of said second supply passes through a zero reference level; and means including a second zero voltage detector coupled with said first supply and adapted to render said first circuit means nonconductive in response to said second circuit means being rendered conductive and in response to the voltage of said first supply passing through a zero reference level.

22. A power transfer system in accordance with claim 21 and further including phase detection means coupled with each of said supplies and with said first voltage detector and adapted to prevent said first detector from rendering said second circuit means conductive unless said power supplies are substantially in phase.

23. A power transfer system comprising in combination: first and second alternating power supply means; load means; first normally conductive circuit means connecting said first power supply means to said load means; second normally nonconductive circuit means connecting said second power supply means to said load means; and selectively operable phase and voltage sensing means responsive to the phase relationship and output voltage levels of said first and second power supply means adapted to render said first circuit means nonconductive and said second circuit means conductive in response to said power supply voltages being substantially in phase and at respective zero reference voltage levels.

24. A power transfer system comprising in combination: first and second power supplies; first normally enabled current control means connected to said first power supply; second normally disabled current control means connected to said second power supply; load means connected to each of said current control means; a transfer switch having a first and a second position; first zero power detector means coupled with said transfer switch means and with said second power supply and operative only when said transfer switch means is in its second position to provide a first signal to enable said second current control means in response to the voltage of said second power supply reaching a zero reference level; and second zero power detector means coupled with said first power supply and with said first zero power detector means and adapted to provide a second signal to disable said first current control means in response to said first signal and to said first power supply voltage reaching its zero reference level.

25. A power transfer system in accordance with claim 24 and further including phase detector means coupled with each of said power supplies and with said first zero power detector means and adapted to prevent the occurrence of said first signal unless said first and second power supplies are in phase.

26. A power transfer system comprising in combination: first and second alternating power supplies; a load circuit; first normally conductive circuit means connecting said first supply to said load circuit; second normally nonconductive circuit means connecting said second power supply to said load circuit; a phase detector coupled with each of said supplies adapted to provide a first signal when the voltages of said supplies are substantially in phase; selectively operable means including a first zero power detector coupled with said phase detector and said second power supply and adapted to provide a second signal in response to the voltage of said second supply being substantially zero during the presence of said first signal; means rendering said second circuit means conductive in response to said second signal; and means responsive to said second signal to render said first circuit means nonconductive.

27. A power transfer system comprising in combination: first and second alternating power supplies; a load circuit; first controlled rectifier means having anode-cathode circuit means connected in circuit between said first supply and said load circuit and having a control electrode means; second controlled rectifier means having anode-cathode circuit means connected in circuit between said second supply and said load circuit and having control electrode means; a first impedance element connected to said first supply; first gating circuit means coupled with the control electrode means of said first rectifier means and coupled with said impedance element and adapted to provide gating signals to said control electrode means of said first rectifier means in response to flow through said impedance element; first current control means connected to said element and to said first supply adapted to control the flow of current through said element; a second impedance element connected to said second power supply; second gating circuit means coupled with the control electrode means of said second rectifier means and with said second element and adapted to provide gating signals to the control electrode means of said second rectifier means in response to current flow through said second element; second current control means connected to said second element and to said second supply adapted to control the flow of current through said second element; transfer switch means having a first and a second condition; control means including zero voltage detecting means coupled with said power supplies, said switch means, and with each of said current control means adapted to maintain said first current control means in a conductive condition and said second current control means in a nonconductive condition when said switch means is in its said first condition and responsive to said switch means being in its said second condition to render said second current control means initially conductive when the voltage of said second power supply passes through its zero reference level and to thereafter maintain said second current control means conductive as long as said switch means is in its said second condition; and circuit means responsive to initial current flow through said second impedance element to render said voltage detecting means operable to render said first current control means nonconductive when the voltage of said first supply is at a zero reference level following said initial current flow and to thereafter maintain said first current control means nonconductive.

28. A power transfer system in accordance with claim 27 wherein: said first current control means includes a third controlled rectifier having an anode-cathode circuit connected in series circuit with said first impedance element across said first power supply and having a control electrode; said second current control means includes a fourth controlled rectifier having an anode-cathode circuit connected in series circuit with said second impedance element across said second power supply and having a control electrode; said zero voltage detecting means includes a fifth controlled rectifier having an anode coupled with said second supply and with the control electrode of said fourth controlled rectifier, and a control electrode; said zero voltage detecting means further including a sixth controlled rectifier having an anode coupled with said first power supply and with the anode of said third rectifier, a cathode connected to the cathode of said third rectifier, and a control electrode; and wherein said transfer switch means when in its first condition includes means directly connecting the control electrode of said sixth rectifier to the cathode of said sixth rectifier and directly connecting the control electrode of said fifth rectifier to the anode of said fifth rectifier.

29. A power transfer system in accordance with claim 28 and further including phase sensing means coupled with said power supplies and with said first impedance element adapted to provide a positive signal on the control electrode of said fifth rectifier in response to the voltage of said two power supplies being out of phase.

References Cited
UNITED STATES PATENTS

| | | | |
|---|---|---|---|
| 3,005,946 | 10/1961 | Thompson | 323—22 |
| 3,181,000 | 4/1965 | Siegel et al. | 307—80 XR |
| 3,244,962 | 4/1966 | Genuit | 323—22 |
| 3,281,638 | 10/1966 | Crawford | 307—88.5 |
| 3,300,651 | 1/1967 | Larsen | 307—64 X |
| 3,310,724 | 3/1967 | Grafham | 323—22 |
| 3,317,741 | 5/1967 | Mc Clair | 307—64 |
| 3,335,360 | 8/1967 | Reinert | 323—22 |

ROBERT K. SCHAEFER, *Primary Examiner.*

ORIS L. RADER, *Examiner.*

T. J. MADDEN, T. B. JOIKE, *Assistant Examiners.*